(12) United States Patent
Nishishige et al.

(10) Patent No.: US 11,045,284 B2
(45) Date of Patent: Jun. 29, 2021

(54) DENTAL BRACE AND METHOD FOR ATTACHING DENTAL BRACE

(71) Applicants: KIRISHIMA SEIKO CO., LTD., Kirishima (JP); MEDICAL CORPORATION KYOUJIN-KAI-SHIMODA ORTHODONTIC CLINIC, Fukuoka (JP); GC CORPORATION, Shizuoka (JP)

(72) Inventors: Junichi Nishishige, Kirishima (JP); Tetsuya Shimoda, Fukuoka (JP)

(73) Assignees: KIRISHIMA SEIKO CO., LTD., Kirishima (JP); MEDICAL CORPORATION KYOUJIN-KAI SHIMODA ORTHODONTIC CLINIC, Fukuoka (JP); GC CORPORATION, Shizuoka (JP)

( * ) Notice: Subject to any disclaimer, the term of this patent is extended or adjusted under 35 U.S.C. 154(b) by 0 days.

(21) Appl. No.: 16/311,157

(22) PCT Filed: Nov. 22, 2017

(86) PCT No.: PCT/JP2017/042095
§ 371 (c)(1),
(2) Date: Dec. 18, 2018

(87) PCT Pub. No.: WO2018/097209
PCT Pub. Date: May 31, 2018

(65) Prior Publication Data
US 2019/0209271 A1  Jul. 11, 2019

(30) Foreign Application Priority Data

Nov. 24, 2016  (JP) .............................. JP2016-227451

(51) Int. Cl.
*A61C 7/16* (2006.01)
*A61C 7/30* (2006.01)

(52) U.S. Cl.
CPC . *A61C 7/30* (2013.01); *A61C 7/16* (2013.01)

(58) Field of Classification Search
CPC .... A61C 7/16; A61C 7/30; A61C 7/14; A61C 7/28; A61C 7/145; A61C 7/12
See application file for complete search history.

(56) References Cited

U.S. PATENT DOCUMENTS 3,765,091 A * 10/1973 Northcutt ................. A61C 7/12
433/9
4,547,153 A * 10/1985 Taylor ....................... A61C 7/12
433/10

(Continued)

FOREIGN PATENT DOCUMENTS

JP  1976-131198 A  11/1976
JP  08-168498 A  7/1996

(Continued)

*Primary Examiner* — Heidi M Eide
(74) *Attorney, Agent, or Firm* — Heedong Chae; Lucem, PC

(57) ABSTRACT

A dental brace is formed with a bracket main body portion, an opening/closing lid portion, 3a and a tooth abutting plate portion. The tooth abutting plate portion includes, on one surface side, a first surface portion which abuts on the surface of a tooth T on the side of a tongue and includes, on a side opposite to the first surface portion, a second surface portion to which the bracket main body portion is adhered, and a charge hole portion is formed which penetrates from the first surface portion to the second surface portion.

10 Claims, 12 Drawing Sheets

(56) References Cited

U.S. PATENT DOCUMENTS

| | | | | |
|---|---|---|---|---|
| 4,575,337 A | * | 3/1986 | Fujita | A61C 7/143 |
| | | | | 433/15 |
| 4,659,309 A | * | 4/1987 | Merkel | A61C 7/12 |
| | | | | 433/16 |
| 4,661,059 A | * | 4/1987 | Kanno | A61C 7/16 |
| | | | | 433/9 |
| 5,435,720 A | * | 7/1995 | Riebschleger | A61C 7/16 |
| | | | | 433/9 |
| 5,902,104 A | * | 5/1999 | Yamada | A61C 7/14 |
| | | | | 433/8 |

FOREIGN PATENT DOCUMENTS

| | | |
|---|---|---|
| JP | 2000-096103 A | 4/2000 |
| JP | 2006-297052 A | 2/2006 |
| JP | 2006-528007 A | 12/2006 |
| JP | 2013-121367 A | 6/2013 |
| JP | 2014-144200 A | 8/2014 |
| JP | 5624094 B2 | 11/2014 |
| WO | 2012/020810 A1 | 2/2012 |

* cited by examiner

DENTAL BRACE AND METHOD FOR ATTACHING DENTAL BRACE

CROSS-REFERENCE TO RELATED APPLICATIONS

This application is based on and claims the benefit of priority to Japanese Patent Application No. 2016-227451 filed on Nov. 24, 2016, with the Japan Patent Office, the disclosure of which is incorporated herein by reference.

TECHNICAL FIELD

The present invention relates to dental braces and a method for attaching such dental braces. More specifically, the present invention relates to dental braces which are securely attached to teeth by simple processing such that sufficient adhesion strength can be maintained within the oral cavity of a person to be treated for along time and to a method for attaching such dental braces.

BACKGROUND ART

Conventionally, as an orthodontic treatment for correcting the alignment of teeth, a method is generally adopted in which orthodontic brackets are fitted to a tooth surface that is the surface of each tooth so as to apply, to each tooth, a mechanical tension force (the restoring force of pressing, pulling back, twisting, etc.) of an archwire attached to the orthodontic brackets of each adjacent tooth, and in which the positions of the teeth are gradually corrected into a proper teeth alignment condition.

Specifically, in the orthodontic bracket, a groove is formed into which the orthodontic archwire can be inserted and whose cross section is substantially concave, the archwire is inserted into the groove and is thereafter fixed within the groove, the tension force applied to the archwire is made to act on the orthodontic bracket and thus the force for correction is made to act on the tooth via the orthodontic bracket (Patent Document 1).

Incidentally, although the orthodontic brackets as described above are normally fixed with an adhesive such as a resin to the teeth of a person to be treated and the model teeth of a set-up impression model taken from an impression of the person to be treated (hereinafter collectively referred to as "teeth"), the orthodontic brackets are required to hold sufficient adhesion strength so that the orthodontic brackets are prevented from falling off the tooth surface during an orthodontic treatment.

For example, Patent Document 2 discloses that an undercut is formed in the tooth abutting surface of an orthodontic bracket. Specifically, a kneaded material containing a metal powder and a binding resin is injection molded, and an undercut is formed in the injection molded member obtained by the injection molding. As described above, the undercut is formed in the tooth abutting surface of the orthodontic bracket, and thus the surface area of an adhesion surface is increased such that the holding force of the adhesive is enhanced, with the result that adhesion strength can be enhanced.

In addition, Patent Document 3 discloses an orthodontic bracket which is suitable for use of a photopolymerization adhesive when the orthodontic bracket is adhered to a tooth. Specifically, the orthodontic bracket includes a base portion which has a mesh layer in a tooth abutting surface that is adhered to the tooth and a main body portion which is fixed to the upper surface of the base portion, and the orthodontic bracket has a structure where, in the upper surface of the base portion, a metallic layer to which the main body portion is fixed is provided and where the outer peripheral edge of the metallic layer is prevented from being protruded up to the mesh layer of the base portion.

Then, a light application unit which can apply light having a specific wavelength is used to apply visible light to the mesh layer containing the adhesive, and thus the adhesive is efficiently cured, with the result that the mesh layer of the base portion is securely fixed to the tooth.

CITATION LIST

Patent Documents

Patent Document 1: Japanese Patent No. 5624094
Patent Document 2: Japanese Unexamined Patent Application Publication No. 2000-96103
Patent Document 3: Japanese Unexamined Patent Application Publication No. 2014-144200

SUMMARY OF INVENTION

Technical Problem

Incidentally, since in general, the size of a dental brace is relatively small, an advanced and precise operation is required for processing and formation of the dental brace. In this regard, when an undercut is formed as disclosed in Patent Document 2, since the operation process thereof is significantly complicated, the number of steps in manufacturing and the product cost are disadvantageously increased.

In the dental brace disclosed in Patent Document 3, although adhesion force to the teeth is enhanced by the mesh layer as an adhesive holding layer, since the mesh layer is formed as a member separate from the dental brace, a step of attaching the mesh layer to the dental brace by diffusion joining or welding, etc., is needed, with the result that as in Patent Document 2, the number of steps in manufacturing and the product cost are disadvantageously increased.

Furthermore, in Patent Document 3, as the adhesive, the photopolymerization adhesive is used, and thus in order to cure the adhesive contained in the mesh layer, for example, such expensive equipment as a light application unit, etc., is needed which can apply light having a specific wavelength, with the result that it is not always possible to easily practice the configuration thereof.

The present invention is made in view of the foregoing, and an object thereof is to provide dental braces in which sufficient adhesion strength can be maintained by simple processing within the oral cavity of a person to be treated for a long time and with which it is possible to reduce an uncomfortable feeling when the dental braces are fitted and a method for attaching such dental braces.

Solution to Problem

In order to achieve the object described above, a dental brace according to the present invention includes: a bracket main body portion in which an archwire insertion groove portion through which an archwire can be inserted and whose cross section is substantially concave is formed; an opening/closing lid portion which is coupled via a pivot to the bracket main body portion so as to be freely opened and closed with respect to the archwire insertion groove portion; and a tooth abutting plate portion which includes, on one surface side, a first surface portion that abuts on the surface of a tooth on the side of a tongue, and on a side opposite to the first surface portion, a second surface portion that includes an adhering surface portion to which the bracket main body portion is adhered and in which a charge hole portion where the diameter of an inner wall surface on the side of the second surface portion is wider than the diameter of the inner wall surface on the side of the first surface portion is formed.

Here, the dental brace includes the bracket main body portion in which the archwire insertion groove portion whose cross section is substantially concave is formed, and thus it is possible to insert the archwire through the archwire insertion groove portion by a simple operation.

The dental brace includes the opening/closing lid portion which is coupled via the pivot to the bracket main body portion so as to be freely opened and closed with respect to the archwire insertion groove portion, and thus the opening/closing lid portion is changed from an opened state to a closed state in a state where the archwire is installed within the archwire insertion groove portion, with the result that it is possible to prevent the archwire from falling out of the inside of the archwire insertion groove portion.

The dental brace includes the tooth abutting plate portion which includes, on one surface side, the first surface portion that abuts on the surface of the tooth on the side of the tongue, and on the side opposite to the first surface portion, the second surface portion that includes the adhering surface portion to which the bracket main body portion is adhered, and thus it is possible to attach the dental brace to the teeth in a state where the bracket main body portion is adhered to the adhering surface portion as the second surface portion in an integrated manner.

In the tooth abutting plate portion, the charge hole portion is formed in which the diameter of the inner wall surface on the side of the second surface portion is wider than the diameter of the inner wall surface on the side of the first surface portion, and thus when a tooth abutting surface is made to abut on, for example, the model teeth of a set-up impression model so as to be attached, part of an adhesive applied to the tooth abutting surface enters the charge hole portion so as to be charged, and thereafter the adhesive is cured within the charge hole portion. Here, the adhesive cured within the charge hole portion functions as a member for preventing the tooth abutting plate portion from being removed in the direction outside of the dental brace, and thus the adhesion strength of the dental brace on the teeth can be maintained for a long time.

When, in the charge hole portion, a step portion is provided in a predetermined position of the inner wall surface, the adhesive which is charged into the charge hole portion and is cured functions, by the step portion, as the member for preventing the tooth abutting plate portion from being removed in the direction outside of the dental brace, and thus the adhesion strength of the dental brace on the teeth can be maintained for a long time.

When, in the charge hole portion, the inner wall surface is formed in a substantially tapered shape which extends from the side of the second surface portion to the side of the first surface portion, the adhesive which is charged into the charge hole portion and is cured functions, by the step portion, as the member for preventing the tooth abutting plate portion from being removed in the direction outside of the dental brace, and thus the adhesion strength of the dental brace on the teeth can be maintained for a long time.

When a plurality of charge hole portions are formed in a peripheral edge of the adhering surface portion, the effect as the anti-removal member caused by the adhesive charged into the charge hole portion acts on the entire dental brace, and thus the adhesion strength of the dental brace on the teeth can be maintained for a long time.

When, in a peripheral edge of the charge hole portion in the first surface portion, a plurality of convex thread portions are provided, since it is possible to increase the adherence area of the adhesive when the adhesive is applied to the first surface portion, the adhesion strength of the dental brace on the teeth can be enhanced.

In a case where, in the bracket main body portion, a fitting concave portion whose cross section is substantially concave is formed, and where, in the opening/closing lid portion, a protrusion portion is provided which can be fitted to the fitting concave portion when the opening/closing lid portion is changed from an opened state to a closed state for the archwire insertion groove portion, the bracket main body portion and the opening/closing lid portion can be securely tightened. Hence, for example, even when a rotation torque produced by the archwire acts on the dental brace, there is no possibility that the opening/closing lid portion is opened with respect to the bracket main body portion, and thus it is possible to prevent the archwire from falling out of the inside of the archwire insertion groove portion.

When the dental brace includes a string-shaped member with which the bracket main body portion and the opening/closing lid portion are securely tightened without interference with the archwire inserted through the archwire insertion groove portion, the bracket main body portion and the opening/closing lid portion can be securely tightened. Hence, for example, even when the rotation torque produced by the archwire acts on the dental brace, there is no possibility that the opening/closing lid portion is opened with respect to the bracket main body portion, and thus it is possible to prevent the archwire from falling out of the inside of the archwire insertion groove portion.

In a case where the string-shaped member is engaged with a first engagement groove portion which is formed in the bracket main body portion and whose cross section is substantially concave and a second engagement groove portion which is formed in the opening/closing lid portion and whose cross section is substantially concave, when the bracket main body portion and the opening/closing lid portion are securely tightened with the string-shaped member, it is possible to attach the dental brace by a simple operation of engaging the string-shaped member with the bracket main body portion and the opening/closing lid portion.

In a case where the string-shaped member is engaged with the first engagement groove portion which is formed in the bracket main body portion and whose cross section is substantially concave and a through hole portion which is formed in the opening/closing lid portion, when the bracket main body portion and the opening/closing lid portion are securely tightened with the string-shaped member, it is possible to attach the dental brace by a simple operation of passing the string-shaped member through the through hole portion and then engaging the string-shaped member with the first engagement groove portion formed in the bracket main body portion, and since part of the string-shaped member is passed through the through hole portion, even when a larger rotation torque from the archwire acts on the dental brace, the state where the bracket main body portion and the opening/closing lid portion are securely tightened can be maintained.

In a case where the archwire insertion groove portion of the bracket main body portion is formed so as to be curved along the surface of the tooth on the side of the tongue in the direction of alignment of the teeth with a predetermined radius of curvature, for example, when the dental brace is installed on the incisor and the canine tooth arranged along the direction of alignment of the teeth with the predetermined radius of curvature, the bracket main body portion easily slides with respect to the archwire, and thus it is possible to prevent a locking phenomenon. Hence, it is possible to easily locate the dental brace on the teeth.

When the radius of curvature of the archwire insertion groove portion is set within a range of R15 to R20, the dental brace can be placed along the average curved surface of the teeth in the person to be treated, and thus the dental brace can be made to more smoothly slide with respect to the archwire.

When the radius of curvature of the archwire insertion groove portion in the bracket main body portion installed on an upper jaw is R20, for example, the dental brace can be placed along the average curved surface of the central incisor and the canine tooth in the person to be treated, and thus the dental brace can be made to most smoothly slide with respect to the archwire.

When the radius of curvature of the archwire insertion groove portion in the bracket main body portion installed on a lower jaw is R15, for example, the dental brace can be placed along the average curved surface of the central incisor and the canine tooth, and thus the dental brace can be made to most smoothly slide with respect to the archwire.

In a case where the archwire insertion groove portion of the bracket main body portion is formed linearly along the surface of the tooth on the side of the tongue in the direction of alignment of teeth, for example, when the dental braces are installed on the premolars arranged linearly along the direction of alignment of the teeth, the bracket main body portion easily slides with respect to the archwire, and thus it is possible to prevent a locking phenomenon. Hence, it is possible to easily locate the dental brace on the teeth.

In order to achieve the object described above, a method for attaching a dental brace according to the present invention includes: a step of applying an adhesive to a first surface portion of a tooth abutting plate portion in which an opening/closing lid portion is provided that is coupled to a bracket main body portion so as to be freely opened and closed with respect to an archwire insertion groove portion which is formed in the bracket main body portion and through which an archwire is inserted and in which a charge hole portion is formed where the diameter of an inner wall surface on the side of a second surface portion including an adhering surface portion to which the bracket main body portion is adhered is wider than the diameter of the inner wall surface on the side of the first surface portion that is a side opposite to the second surface portion; a step of making the side of the first surface portion abut on the surface of a set-up impression model on the side of a tongue; a step of making the adhesive enter the charge hole portion; a step of curing the adhesive; a step of inserting the archwire through the archwire insertion groove portion; and a step of securely tightening the bracket main body portion and the opening/closing lid portion without the bracket main body portion and the opening/closing lid portion interfering with the archwire.

Here, the step of applying the adhesive to the first surface portion of the tooth abutting plate portion in which the opening/closing lid portion is provided that is coupled to the bracket main body portion so as to be freely opened and closed with respect to the archwire insertion groove portion which is formed in the bracket main body portion and through which the archwire is inserted and in which the charge hole portion is formed where the diameter of the inner wall surface on the side of the second surface portion including the adhering surface portion to which the bracket main body portion is adhered is wider than the diameter of the inner wall surface on the side of the first surface portion that is the side opposite to the second surface portion is included, and thus part of the adhesive applied to the first surface portion is made to efficiently enter the charge hole portion, with the result that the adhesive can be charged into the charge hole portion.

The step of making the dental brace abut on the surface of the model teeth of the set-up impression model on the side of the tongue is included, and thus the side of the first surface portion to which the adhesive is applied is made to abut on the surface of the model teeth on the side of the tongue, with the result that the dental brace can be fixed to the set-up impression model.

The step of making the adhesive enter the charge hole portion is included, and thus the adhesive applied to the side of the first surface portion is made to enter the inside of the charge hole portion so as to be pressed thereinto when the dental brace is made to abut on the model teeth, with the result that a sufficient amount of adhesive can be charged into the charge hole portion.

The step of inserting the archwire through the archwire insertion groove portion formed in the bracket main body portion is included, and thus the archwire is installed into the dental brace, with the result that a certain tension can be made to act on the teeth.

The step of securely tightening the bracket main body portion and the opening/closing lid portion without the bracket main body portion and the opening/closing lid portion interfering with the archwire is included, and thus the bracket main body portion and the opening/closing lid portion can be securely tightened. Hence, for example, even when a rotation torque from the archwire acts on the dental brace, there is no possibility that the opening/closing lid portion is opened with respect to the bracket main body portion, with the result that it is possible to prevent the archwire from falling out of the inside of the archwire insertion groove portion.

In a case where, in the step of securely tightening the bracket main body portion and the opening/closing lid portion without the bracket main body portion and the opening/closing lid portion interfering with the archwire, a string-shaped member is engaged with a first engagement groove portion which is formed in the bracket main body portion and whose cross section is substantially concave and a second engagement groove portion which is formed in the opening/closing lid portion and whose cross section is substantially concave, when the bracket main body portion and the opening/closing lid portion are securely tightened with the string-shaped member, the dental brace can be attached by a simple operation of engaging the string-shaped member with the bracket main body portion and the opening/closing lid portion.

In a case where, in the step of securely tightening the bracket main body portion and the opening/closing lid portion without the bracket main body portion and the opening/closing lid portion interfering with the archwire, the string-shaped member is engaged with the first engagement groove portion which is formed in the bracket main body portion and whose cross section is substantially concave and a through hole portion which is formed in the opening/closing lid portion, when the bracket main body portion and the opening/closing lid portion are securely tightened with the string-shaped member, the dental brace can be attached by a simple operation of passing the string-shaped member through the through hole portion and then engaging the string-shaped member with the first engagement groove portion formed in the bracket main body portion, and since part of the string-shaped member is passed through the through hole portion, even when a larger rotation torque from the archwire acts on the dental brace, the state where the bracket main body portion and the opening/closing lid portion are securely tightened can be maintained.

Advantageous Effects of Invention

In a dental brace and a method for attaching such a dental brace according to the present invention, the dental brace is securely attached to teeth by simple processing, and within the oral cavity of a person to be treated, sufficient adhesion strength can be maintained for a long time.

BRIEF DESCRIPTION OF DRAWINGS

FIG. 2A is a diagram of a front side (the side of a tongue) in an exploded state and FIG. 2B is a diagram of a back side (the side of the teeth) in an assembled state;

FIG. 3A is a diagram showing a state where an opening/closing lid portion is opened and FIG. 3B is a diagram showing a state where the opening/closing lid portion is closed;

FIG. 4A is a diagram showing the archwire insertion groove portion which has a predetermined curvature and FIG. 4B is a diagram showing a linear archwire insertion groove portion;

FIG. 5A is a diagram showing a state before an adhesive is charged and FIG. 5B is a diagram showing a state after the adhesive is charged;

FIG. 6A is a diagram showing a state of an early stage of treatment and FIG. 6B is a diagram showing a state of a later stage of treatment;

FIG. 7A is a diagram showing an exploded state and FIG. 7B is a diagram showing an assembled state;

FIG. 8A is a diagram showing a state where an opening/closing lid portion is opened and FIG. 8B is a diagram showing a state where the opening/closing lid portion is closed;

FIG. 9A is a diagram showing a state before an adhesive is charged and FIG. 9B is a diagram showing a state after the adhesive is charged;

FIG. 10A is a diagram showing an exploded state, FIG. 10B is a diagram showing a state of an early stage of treatment and FIG. 10C is a diagram showing a state of a later of stage treatment; FIG. 11A is a diagram showing an exploded state and FIG. 11B is a diagram showing an assembled state.

DESCRIPTION OF EMBODIMENTS

Embodiments of the present invention on dental braces and a method for attaching such dental braces will be described below with reference to drawings so as to understand the present invention. For convenience of description of individual drawings, the description will be given based on a state where dental braces 1 are fitted to teeth T on the side of a lower jaw, and the direction of an upper jaw is defined as being upward and the direction of the lower jaw is defined as being downward.

Figure 1:
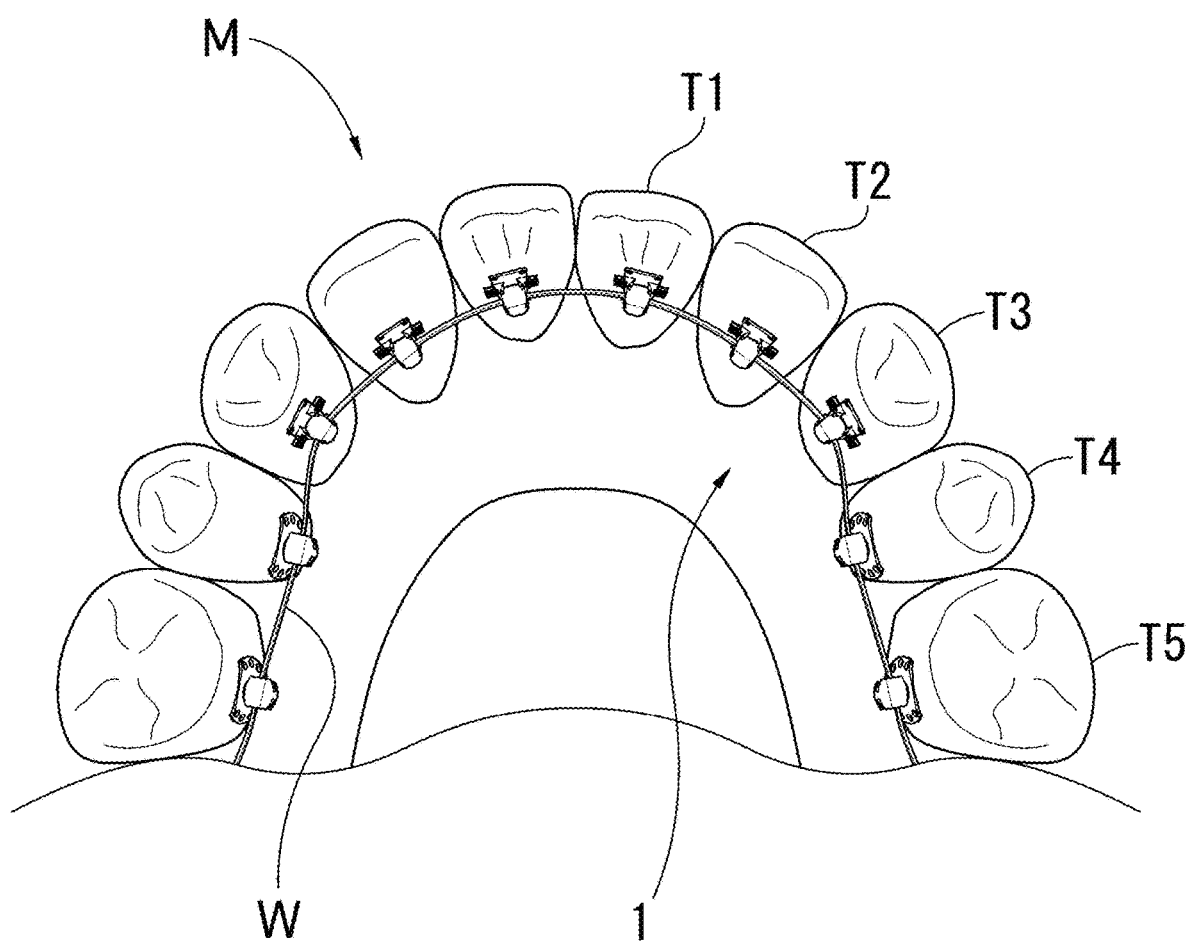
FIG. 1 is a diagram showing a state where dental braces are attached to teeth.

FIG. 1 is an overall view showing a state where the dental braces 1 according to the present invention are attached to a set-up impression model M on the side of the lower jaw which is produced based on an impression taken from a person to be treated. The dental braces 1 whose raw material is stainless steel, titanium, ceramic, etc., and whose shapes differ according to the types of teeth T (mainly a central incisor T1, a lateral incisor T2, a canine tooth T3, a first premolar T4 and a second premolar T5) abut on the surface of the teeth T on the side of a tongue.

Here, the dental braces 1 do not always need to be formed of a raw material such as stainless steel, titanium or ceramic. Any material may be used as long as the material is prevented from being degraded, corroded or damaged even in a harsh use environment within an oral cavity and is confirmed to be safe in medical terms.

Embodiment 1

A dental brace 1a according to a first embodiment of the present invention will first be described with reference to FIGS. 2A to 6B. Although, for convenience of description, the embodiment in which the dental braces 1a are attached to the central incisor T1, the lateral incisor T2 and the canine tooth T3 will be described, the dental braces 1a can also be attached to the other teeth T (for example, the first premolar T4 and the second premolar T5).

The dental braces 1a are shaped along the surface of the central incisor T1, the lateral incisor T2 and the canine tooth T3 on the side of the tongue, and the dental brace 1a has a vertically long shape as a whole and is mainly formed with a bracket main body portion 2a, an opening/closing lid portion 3a and a tooth abutting plate portion 4a.

In the bracket main body portion 2a, an archwire insertion groove portion 21 is formed whose cross section is substantially concave and which is opened obliquely upward when the dental braces 1a are fitted to the teeth T (which is opened obliquely downward when the dental braces 1a are fitted to the teeth T on the side of the upper jaw). An archwire W is inserted into the archwire insertion groove portion 21, and thus it is possible to correct the alignment of the teeth of the person to be treated with a biasing force corresponding to the initial shape.

Here, the archwire insertion groove portion 21 does not always need to be opened obliquely upward (obliquely downward) in a state where the bracket main body portion 2a is attached to the person to be treated, and the archwire insertion groove portion 21 may be opened in any direction.

Figure 4A:
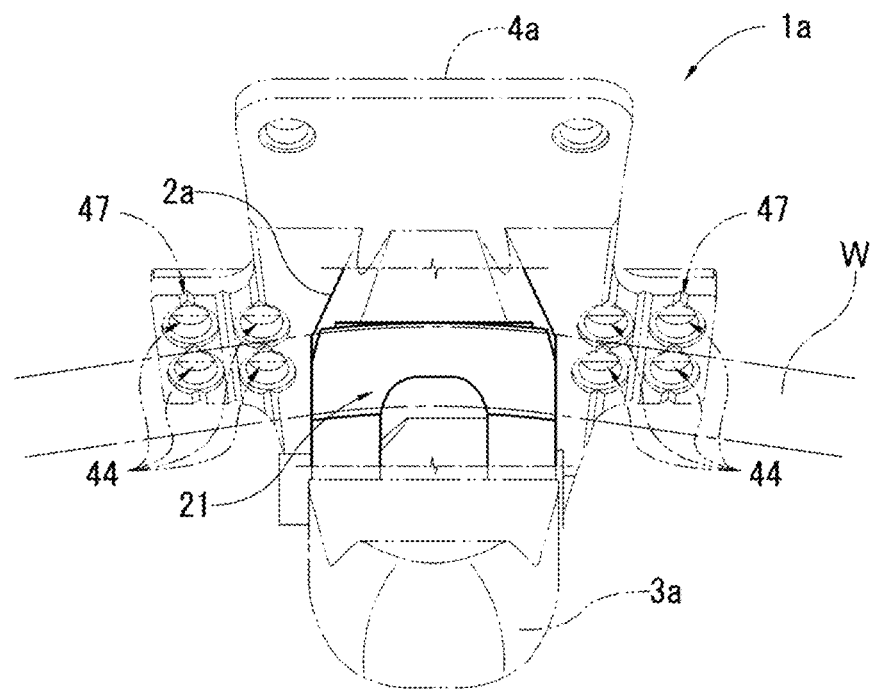
FIGS. 4A and 4B are enlarged views of a main portion of an archwire insertion groove portion in the dental brace according to the first embodiment of the present invention.
Figure 4B:
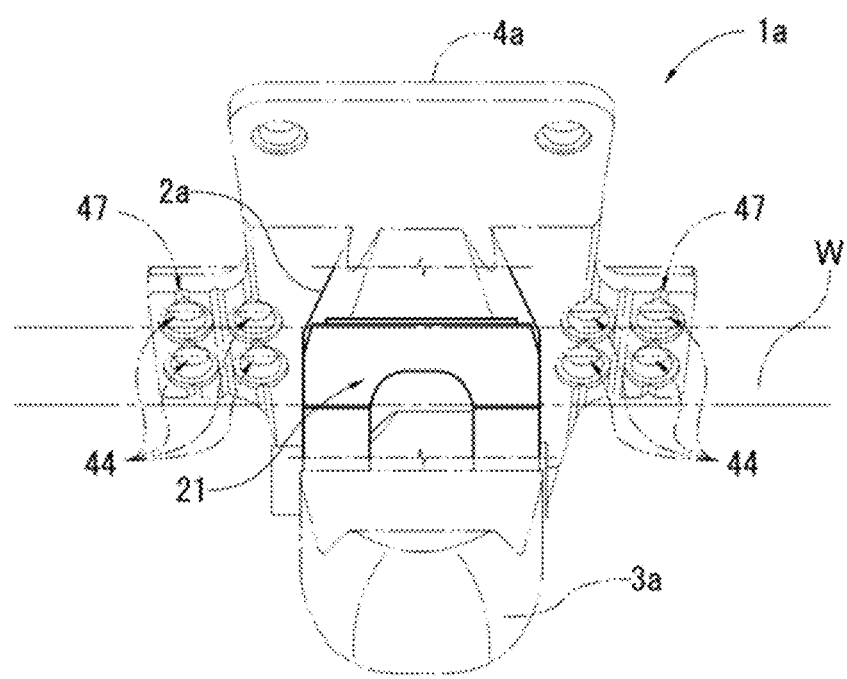

The shape of the archwire insertion groove portion 21 will be described with reference to FIGS. 4A and 4B. FIGS. 4A and 4B are enlarged views of a main portion when the archwire insertion groove portion 21 is seen in plan view along the direction of alignment of the teeth in a state where the archwire W is attached to the inside of the archwire insertion groove portion 21. As shown in FIG. 4A, the archwire insertion groove portion 21 is formed in the shape of a smooth arc along the direction of alignment of the central incisor T1, the lateral incisor T2 and the canine tooth T3 with a predetermined radius of curvature (R15 to R20).

Specifically, since the central incisor T1, the lateral incisor T2 and the canine tooth T3 are aligned as a whole with the predetermined radius of curvature, when the archwire W is formed along the alignment of the teeth of the person to be treated, a curved portion is formed in the positions of the archwire W corresponding to the central incisor T1, the lateral incisor T2 and the canine tooth T3. Hence, the archwire insertion groove portion 21 is formed along the curved portion of the archwire W with the predetermined radius of curvature so as to have the shape of a smooth arc.

Since in general, the curvature of alignment of the teeth on the side of the upper jaw is gentler than the curvature of alignment of the teeth on the side of the lower jaw, in the embodiment of the present invention, the archwire insertion groove portion 21 is formed such that the radius of curvature of the archwire insertion groove portion 21 formed in the dental brace 1a installed on the side of the upper jaw is R20 and that the radius of curvature of the archwire insertion groove portion 21 formed in the dental brace 1a installed on the side of the lower jaw is R15.

Here, it is not always necessary to form the archwire insertion groove portion 21 with the predetermined radius of curvature in the shape of an arc. For example, the archwire insertion groove portion 21 may be formed linearly along the direction of alignment of the teeth. However, the archwire insertion groove portion 21 is formed along the direction of alignment of the central incisor T1, the lateral incisor T2 and the canine tooth T3 in the shape of an arc, and thus the dental braces 1a individually installed in the central incisor T1, the lateral incisor T2 and the canine tooth T3 can slide with respect to the archwire W such that the locking phenomenon of the dental braces 1a is prevented from occurring when they are fitted to the person to be treated, with the result that it is possible to easily locate the dental braces 1a with respect to the person to be treated. Hence, the archwire insertion groove portion 21 is preferably formed in the shape of an arc.

It is not always necessary to set the radius of curvature of the archwire insertion groove portion 21 within the range of R15 to R20. For example, the radius of curvature can be changed as necessary according to the state of alignment of the teeth in the person to be treated. However, as a result of examinations repeated by the inventors, in general, the radius of curvature of the curved portion of the archwire W formed in the central incisor T1, the lateral incisor T2 and the canine tooth T3 falls within the range of R15 to R20, and in particular, the radius of curvature of the archwire insertion groove portions 21 formed in the dental braces 1a installed in the central incisor T1, lateral incisor T2 and the canine tooth T3 on the side of the upper jaw is set to R20 and the radius of curvature of the archwire insertion groove portions 21 formed in the dental braces 1a installed in the central incisor T1, lateral incisor T2 and the canine tooth T3 on the side of the lower jaw is set to R15, with the result that it is possible to make the dental braces 1a slide with respect to the archwire W most smoothly.

In the canine tooth T3, depending on the person to be treated, when the archwire W is formed along the alignment of the teeth, it is likely that the curved portion is not formed in the position corresponding to the tooth T3 so as to be formed linearly. Hence, as shown in FIG. 4B, it may be preferable to form the archwire insertion groove portion 21 of the dental brace 1 linearly instead of the shape of an arc, however, the shape of the archwire insertion groove portion 21 can be changed as necessary according to the alignment of the teeth in the person to be treated.

On the lower side of the archwire insertion groove portion 21, a pair of main body side pivot portions 24 where main body side pivot hole portions 23 through which a pivot pin 22 to be described later can be inserted are formed are provided so as to protrude to the side of the tongue. On the upper side of the archwire insertion groove portion 21, a first engagement groove portion 25 with which part of a string-shaped member 5 to be described later can engage and whose cross section is substantially concave is formed along the direction of alignment of the teeth in the bracket main body portion 2a so as to be opened upward.

In the opening/closing lid portion 3a, a lid side pivot portion 32 is provided whose outer surface is formed in the shape of a gentle curved surface and in which a lid side pivot hole portion 31 overlaid on the main body side pivot hole portions 23 of the bracket main body portion 2a is formed. When the opening/closing lid portion 3a is attached to the bracket main body portion 2a, the lid side pivot hole portion 31 of the opening/closing lid portion 3a is overlaid on the main body side pivot hole portions 23 of the bracket main body portion 2a, the pivot pin 22 is inserted such that they are fixed and thus the opening/closing lid portion 3a is attached to the archwire insertion groove portion 21 so as to be freely opened and closed.

Figure 3A:
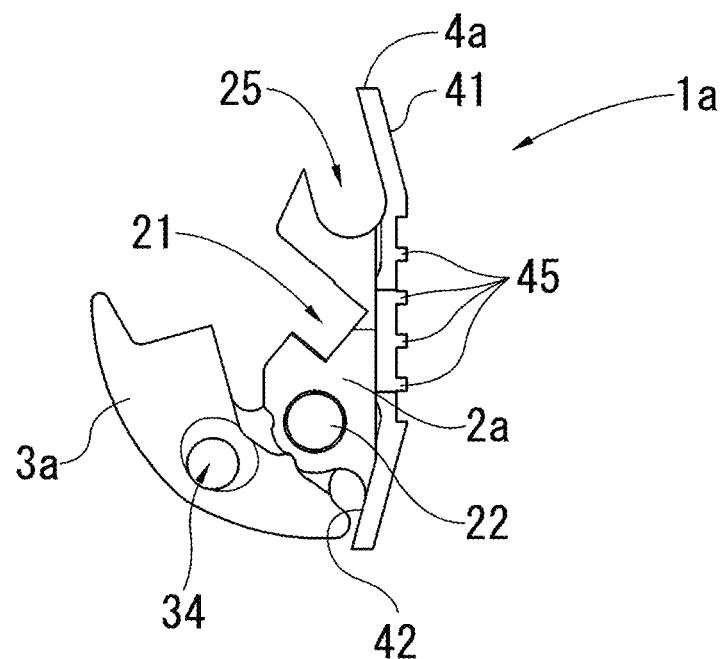
FIGS. 3A and 3B are side views of the dental brace according to the first embodiment of the present invention.
Figure 3B:
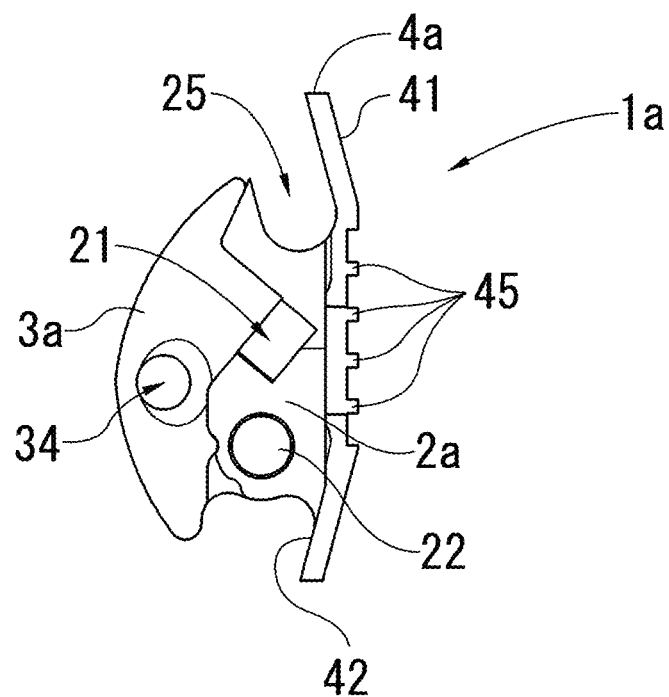

Specifically, when the archwire W is attached to the archwire insertion groove portion 21 of the bracket main body portion 2a, as shown in FIG. 3A, the opening/closing lid portion 3a is brought into an opened state for the archwire insertion groove portion 21, the archwire W is attached to the archwire insertion groove portion 21 and thereafter as shown in FIG. 3B, the opening/closing lid portion 3a is brought into a closed state for the archwire insertion groove portion 21, with the result that the archwire W can be prevented from falling out of the archwire insertion groove portion 21.

Here, the outer surface of the opening/closing lid portion 3a does not always need to be formed in the shape of a curved surface. However, in a case where the outer surface of the opening/closing lid portion 3a is formed in the shape of a curved surface, for example, when the dental braces 1a are installed within the oral cavity of the person to be treated, even if the tongue of the person to be treated is brought into contact with the opening/closing lid portion 3a, the person to be treated is prevented from feeling pain. Hence, the outer surface of the opening/closing lid portion 3a is preferably formed in the shape of a curved surface.

It is not always necessary to attach the opening/closing lid portion 3a to the bracket main body portion 2a via the pivot pin 22. As long as the opening/closing lid portion 3a is attached to the archwire insertion groove portion 21 formed in the bracket main body portion 2a so as to be freely opened and closed, a method for attaching it can be selected from known means as necessary.

In the vicinity of the lid side pivot hole portion 31 on the side of one end of the opening/closing lid portion 3a, a second engagement groove portion 33 is formed with which the string-shaped member 5 to be described later can engage and whose cross section is substantially concave, and substantially around the center of the opening/closing lid portion 3a, a through hole portion 34 is formed which penetrates the opening/closing lid portion 3a in a short-length direction.

Figure 2A:
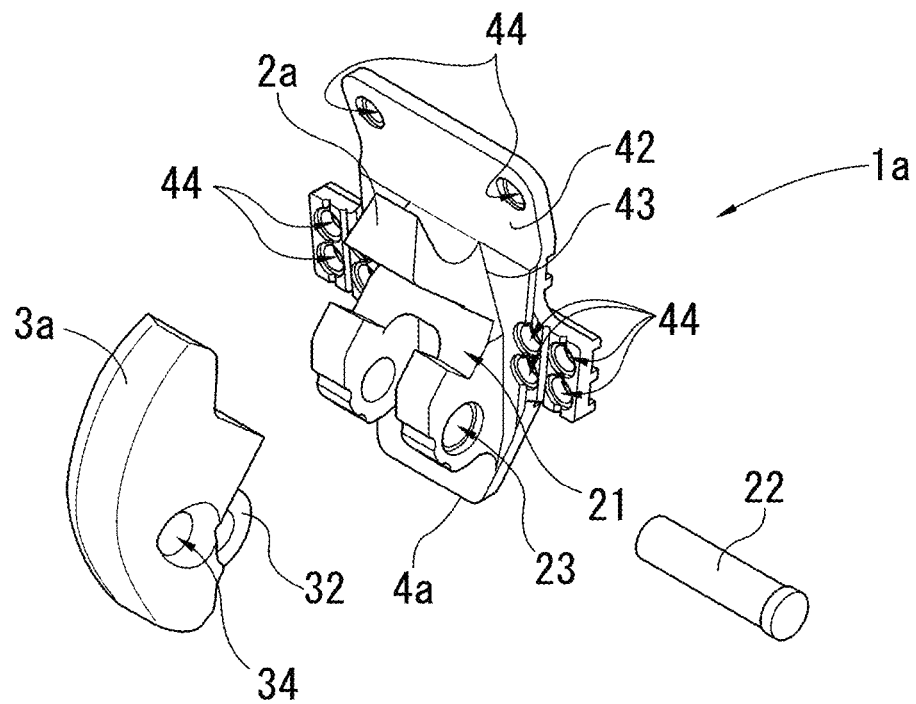
FIGS. 2A and 2B are perspective views of a dental brace according to a first embodiment of the present invention.
Figure 2B:
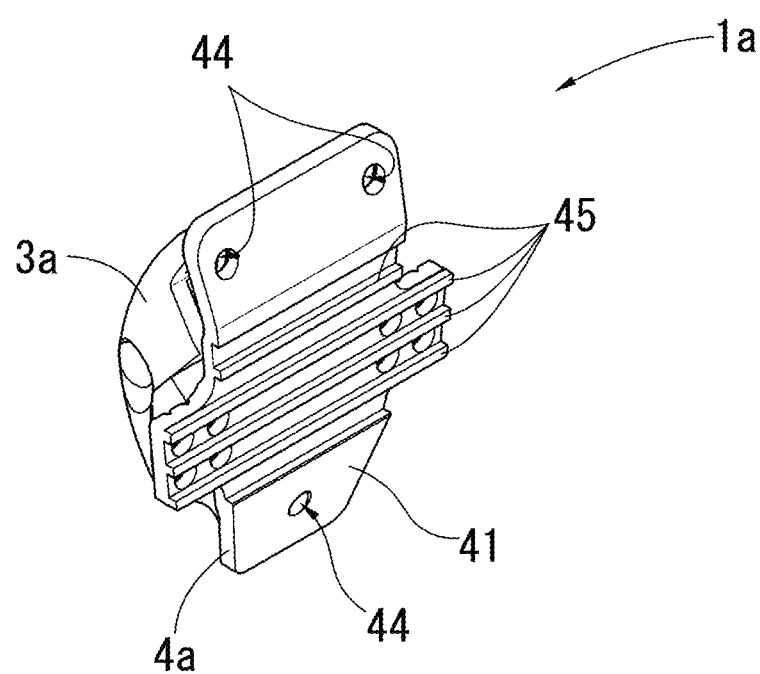

The tooth abutting plate portion 4a is processed to be curved, as shown in FIGS. 2A and 2B, along the shape of the surface of the central incisor T1, the lateral incisor T2 and the canine tooth T3 on which the tooth abutting plate portion 4a abuts on the side of the tongue, includes, on one surface side, a first surface portion 41 which abuts on the surface of the central incisor T1, the lateral incisor T2 and the canine tooth T3 on the side of the tongue and includes, in a region of a substantially center of the other surface side (the side of the bracket main body portion) on a side opposite to the first surface portion 41, a second surface portion 42 which includes an adhering surface portion 43 to which the integrally molded bracket main body portion 3a is adhered.

Here, it is not always necessary for the tooth abutting plate portion 4a to be curved along the shape of the surface of the central incisor T1, the lateral incisor T2 and the canine tooth T3 on which the tooth abutting plate portion 4a abuts on the side of the tongue, and the tooth abutting plate portion 4a may be formed linearly. However, the tooth abutting plate portion 4a is processed to be curved, and thus the adherence of the tooth abutting plate portion 4a to the central incisor T1, the lateral incisor T2 and the canine tooth T3 is enhanced, with the result that sufficient adhesion strength can be maintained within the oral cavity of the person to be treated for a long time.

It is not always necessary to integrally mold the bracket main body portion 3a and the tooth abutting plate portion 4a. The bracket main body portion 3a and the tooth abutting plate portion 4a may be molded as separate members.

In the tooth abutting plate portion 4a, a total of eleven charge hole portions 44 are formed, that is, four charge hole portions 44 are formed in each of the positions symmetrical with respect to the adhering surface portion 43 to which the bracket main body portion 2a is adhered in the direction of alignment of the teeth, two charge hole portions 44 are formed in an upper position and one charge hole portion 44 is formed in a lower position. Furthermore, around the charge hole portions 44 on the side of the first surface portion 41 of the tooth abutting plate portion 4a, a plurality of convex thread portions 45 are provided so as to extend from the first surface portion 41 toward the side of the teeth T.

Here, it is not always necessary to form the total of eleven charge hole portions 44. The number of charge hole portions 44 can be changed as necessary according to the area of the tooth abutting plate portion 4a, etc.

It is not always necessary to form the charge hole portions 44 in the positions symmetrical with respect to the adhering surface portion 43 in the direction of alignment of the teeth, the charge hole portions 44 in the upper position and the charge hole portion 44 in the lower position. The charge hole portions 44 may be formed in any region as long as the region is the peripheral edge of the adhering surface portion 43. However, the charge hole portions 44 are formed symmetrically with respect to at least the adhering surface portion 43 in the direction of alignment of the teeth, and thus an effect as an anti-removal member caused by an adhesive R can be made to uniformly act on the entire dental brace 1, with the result that adhesion strength can be further enhanced.

Figure 5A:
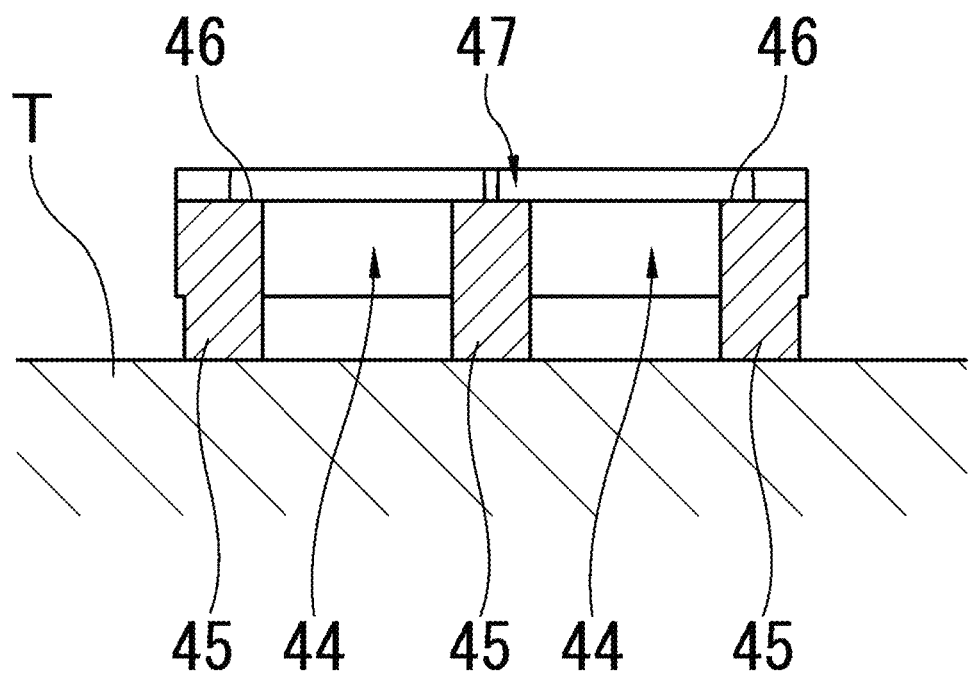
FIGS. 5A and 5B are enlarged cross-sectional views showing charge hole portions in the dental brace according to the first embodiment of the present invention.

As shown in FIG. 5A, the charge hole portion 44 includes, in its cross-sectional shape, a step portion 46 in a predetermined position of an inner wall surface on the side of the second surface portion 42, and a diameter on the side of the second surface portion 42 is made wider than a diameter on the side of the first surface portion 41. Furthermore, on the side of the second surface portion 42, a V-shaped groove portion 47 whose cross section is substantially V-shaped is formed so as to pass through a substantially center of a pair of charge hole portions 44.

In other words, as described above, the diameter of the charge hole portion 44 on the side of the second surface portion 42 is made wider than the diameter on the side of the first surface portion 41, and thus as shown in FIG. 5A, the adhesive R which is cured within the charge hole portion 44 functions as the member for preventing the tooth abutting plate portion 4a from being removed in an outward direction. Hence, sufficient adhesion strength can be maintained within the oral cavity of the person to be treated for a long time.

Here, it is not always necessary to form the step portion 46 in the inner wall surface of the charge hole portion 44 on the side of the second surface portion 42. As long as in the configuration of the charge hole portion 44, the diameter on the side of the second surface portion 42 is made wider than the diameter on the side of the first surface portion 41, the step portion 46 may be formed in any position of the inner wall surface of the charge hole portion 44.

It is not always necessary to provide the convex thread portions 45 on the first surface portion 41 of the tooth abutting plate portion 4a. However, a plurality of convex thread portions 45 are provided along the direction of alignment of the charge hole portions 44, and thus it is possible to increase the contact area of the adhesive R which is applied to the first surface portion 41, with the result that the convex thread portions 45 are preferably provided in terms of enhancing adhesion strength.

It is not always necessary to form the V-shaped groove portion 47 on the side of the second surface portion 42. However, the V-shaped groove portion 47 is formed, and thus it is possible to increase, in the second surface portion 42, the contact area of the adhesive R which enters from the charge hole portion 44, with the result that the V-shaped groove portion 47 is preferably formed in terms of enhancing adhesion strength.

Figure 5B:
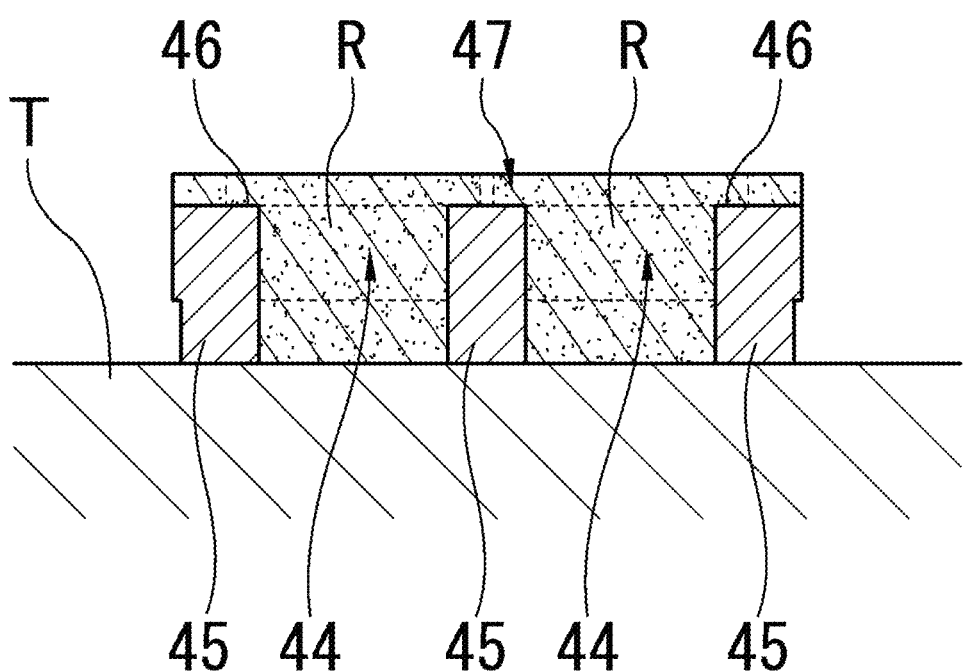

When the dental braces 1a including the tooth abutting plate portions 4a where the charge hole portions 44 as described above are formed are fixed to the central incisor T1, the lateral incisor T2, the canine tooth T3 in the set-up impression model M produced from, for example, the impression of the person to be treated, the adhesive R is first applied to the first surface portion 41 of the tooth abutting plate portion 4a. Here, part of the adhesive R applied to the first surface portion 41 enters the charge hole portions 44 as shown in FIG. 5B and is thereafter cured.

Here, the diameter on the side of the first surface portion 41 in the charge hole portion 44 is made wider than the diameter on the side of the second surface portion 42, and thus the cured adhesive R functions as the member for preventing the tooth abutting plate portion 4a from being removed in the direction of the side of the tongue. Hence, even when the dental braces 1a are removed from the set-up impression model M and are attached to the interior of the oral cavity of the person to be treated, sufficient adhesion strength can be maintained for a long time.

Figure 6A:
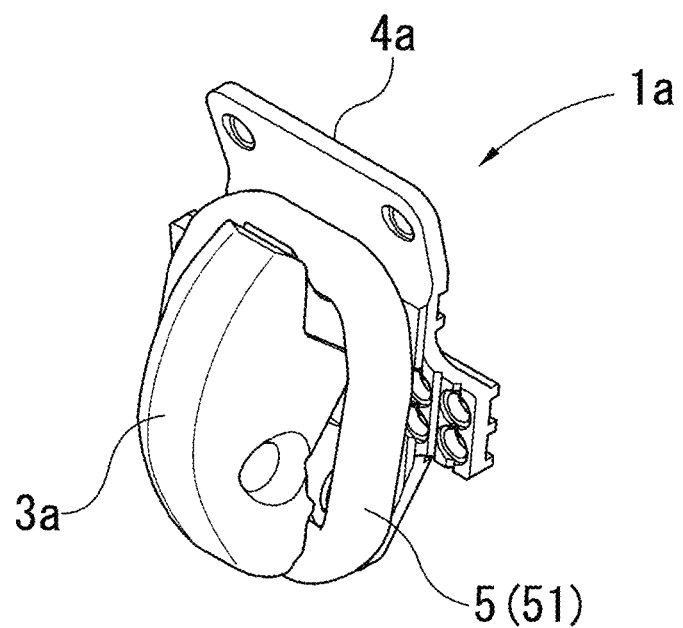
FIGS. 6A and 6B are perspective views in which a string-shaped member in the dental brace according to the first embodiment of the present invention is attached.
Figure 6B:
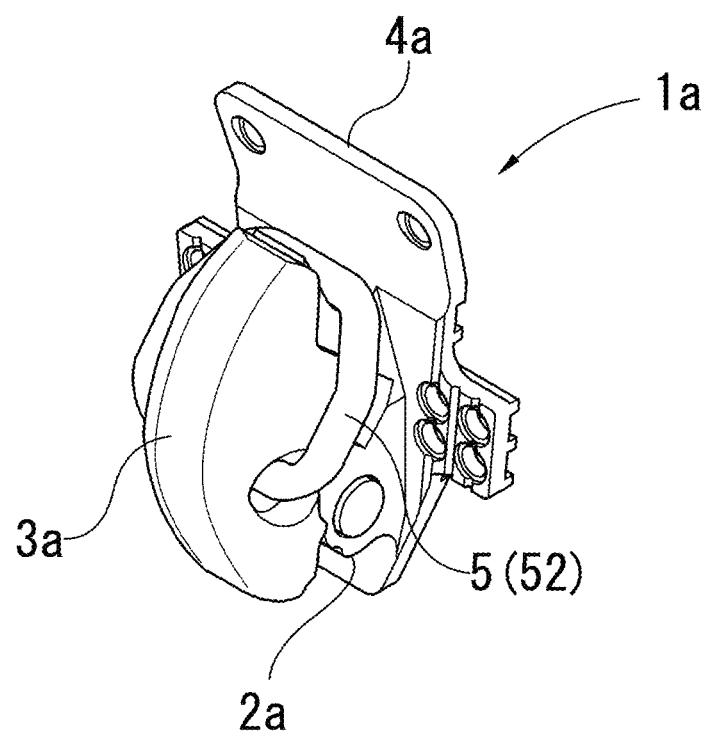

As shown in FIGS. 6A and 6B, the string-shaped member 5 is a string-shaped member which regulates the movement of the opening/closing lid portion 3a to an opened position in a state where the opening/closing lid portion 3a is brought into a closed position for the archwire insertion groove portion 21 without interference with the archwire W, and is formed with, for example, an elastic resin member 51 (hereinafter referred to as an "elastic string-shaped member") or a stainless steel member 52 (hereinafter referred to as a "stainless steel string-shaped member"). As these string-shaped members 5, the elastic string-shaped member 51 and the stainless steel string-shaped member 52 are selectively used according to the step of treatment of the person to be treated.

First, at an early stage of the treatment, as shown in FIG. 6A, the elastic string-shaped member 51 is engaged with the first engagement groove portion 25 formed in the bracket main body portion 2a and the second engagement groove portion 33 formed in the opening/closing lid portion 3a so as to be securely tightened, and thus the bracket main body portion 2a and the opening/closing lid portion 3a are integrated.

On the other hand, the treatment progresses, and at a later stage of treatment, as shown in FIG. 6B, the stainless steel string-shaped member 52 is engaged with the first engagement groove portion 25 formed in the bracket main body portion 2a and the through hole portion 34 formed in the opening/closing lid portion 3a so as to be securely tightened, and thus the bracket main body portion 2a and the opening/closing lid portion 3a are integrated.

Here, it is not always necessary to use the elastic string-shaped member 51 as the string-shaped member 5 at an early stage of treatment, and for example, the stainless steel string-shaped member 52 may be used. However, since at an early stage of treatment, the archwire W whose diameter is small is used, a rotation torque which acts from the archwire W on the dental braces 1a is relatively small. Hence, even when the elastic string-shaped member 51 is used, there is no possibility that the rotation torque produced by the archwire W damages the elastic string-shaped member 51, with the result that, at an early stage of treatment, a relatively inexpensive elastic string-shaped member 51 is preferably used.

It is not always necessary to use the stainless steel string-shaped member 52 as the string-shaped member 5 at a later stage of treatment, and for example, the elastic string-shaped member 51 may be used. However, since at a later stage of the treatment, the archwire W whose diameter is larger than the diameter at an early stage is used, a rotation torque which acts from the archwire W on the dental braces 1a is relatively large. Hence, when the elastic string-shaped member 51 is used instead of the stainless steel string-shaped member 52, there is a possibility that the elastic string-shaped member 51 is damaged by the rotation torque produced by the archwire W. Hence, at a later stage of treatment, it is preferable to use a stainless steel string-shaped member 52 which can secure a certain degree of rigidity.

Embodiment 2

Figure 7A:
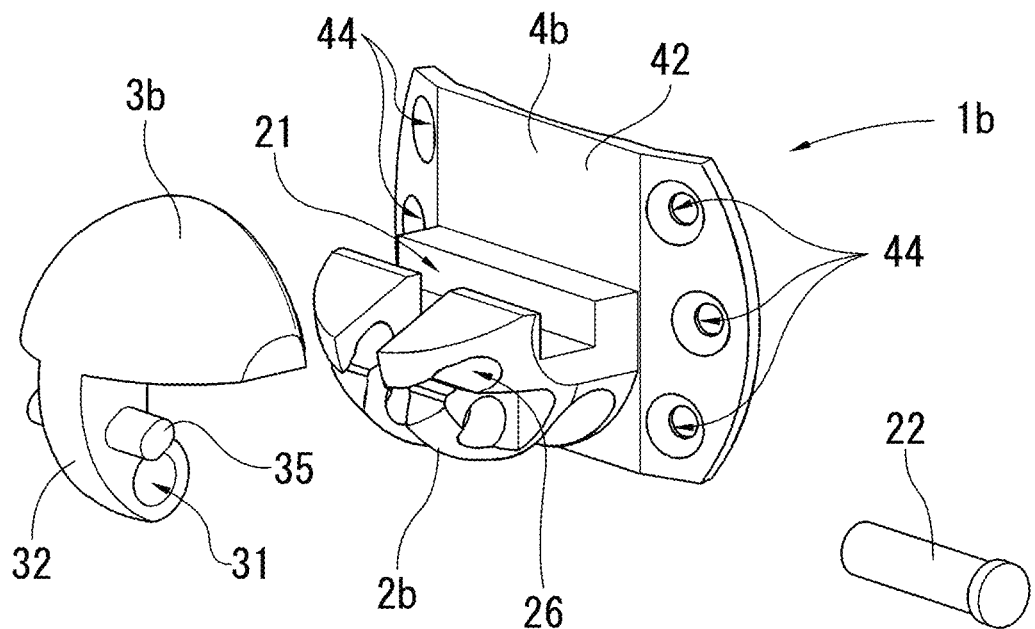
FIGS. 7A and 7B are perspective views of a dental brace according to a second embodiment of the present invention.
Figure 7B:
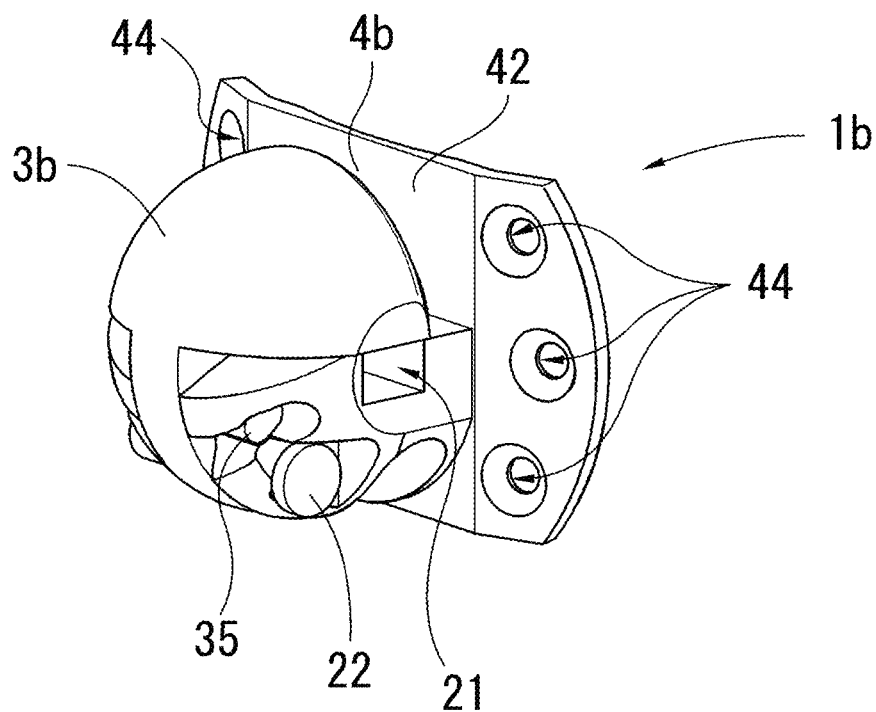

A dental brace 1b according to a second embodiment of the present invention will then be described with reference to FIGS. 7 to 9. Although, in the second embodiment, for convenience of description, a case where the dental braces 1b are attached to the premolars (the first premolar T4 and the second premolar T5) will be described, the dental braces 1b can be attached to the other teeth T (for example, the central incisor T1, the lateral incisor T2 and the canine tooth T3). The same portions as in the other embodiments are identified with the same signs, and repeated description will be omitted.

The dental brace 1b according to the second embodiment is also mainly formed with a bracket main body portion 2b, an opening/closing lid portion 3b and a tooth abutting plate portion 4b.

In the bracket main body portion 2b, an archwire insertion groove portion 21 whose cross section is substantially concave and which is opened upward is formed. The shape of the surface of the first premolar T4 and the second premolar T5 on the side of the tongue is basically linear along the direction of alignment of the teeth, and thus the archwire insertion groove portion 21 is linearly formed along the direction of alignment of the teeth, with the result that the dental brace 1b can slide with respect to the archwire W.

Here, the archwire insertion groove portion 21 does not always need to be opened upward in a state where the bracket main body portion 2c is attached to the tooth T, and the bracket main body portion may be opened in any direction.

In the bracket main body portion 2b, fitting concave portions 26 to which protrusion portions 35 provided on the lid side pivot portion 32 of the opening/closing lid portion 3b to be described later can be fitted are formed so as to be opened to the side of the tongue, and a pair of main body side pivot portions 24 are provided where main body side pivot hole portions 23 which are adjacent to the fitting concave portions 26 and through which a pivot pin 22 can be inserted are formed.

In the opening/closing lid portion 3a, an opening/closing shaft is attached via the pivot pin 22 to the lid side pivot portion 32 whose outer surface is formed in the shape of a substantially hemispherical surface and in which a lid side pivot hole portion 31 overlaid on the main body side pivot hole portions 23 of the bracket main body portion 2b is formed so as to be freely opened and closed. In predetermined positions of the lid side pivot portion 32 of the opening/closing lid portion 3b, the protrusion portions 35 to which the fitting concave portions 26 formed in the bracket main body portion 2b can be fitted and which are protruded laterally are provided.

Figure 8A:
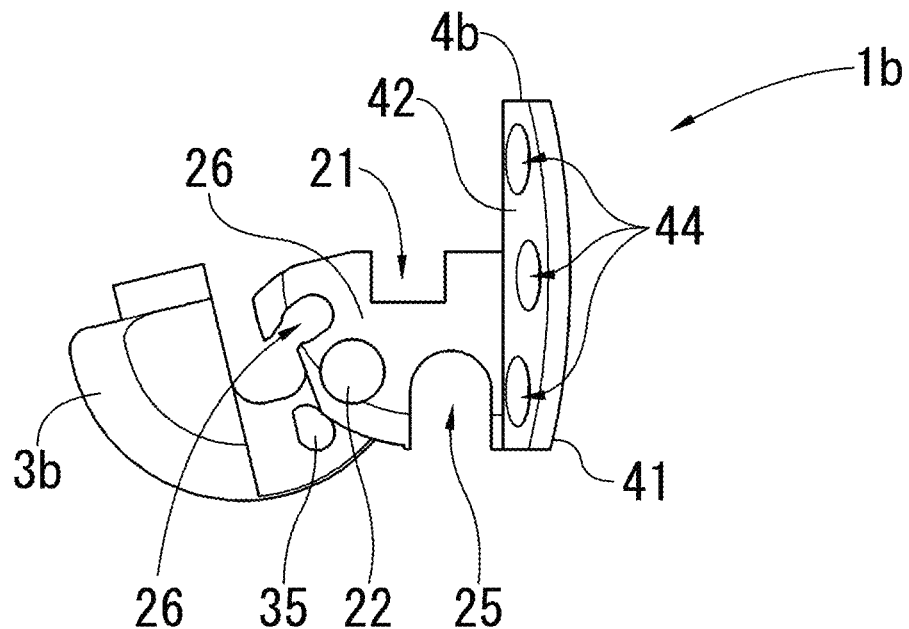
FIGS. 8A and 8B are side views of the dental brace according to the second embodiment of the present invention.
Figure 8B:
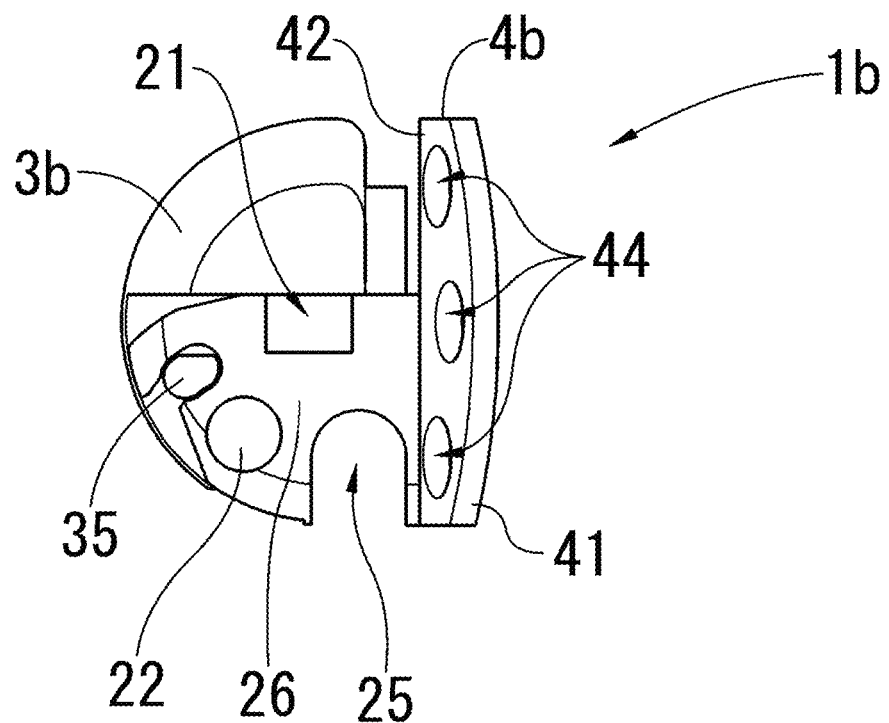

Specifically, when the archwire W is attached to the archwire insertion groove portion 21 of the bracket main body portion 2b, as shown in FIG. 8A, the opening/closing lid portion 3b is brought into an opened state, the archwire W is attached to the archwire insertion groove portion 21 and thereafter as shown in FIG. 8B, the opening/closing lid portion 3b is brought into a closed state, with the result that the archwire W can be prevented from falling out of the archwire insertion groove portion 21. Here, the protrusion portions 35 of the opening/closing lid portion 3b are fitted to the fitting concave portions 26 of the bracket main body portion 2b, and thus the bracket main body portion 3b and the opening/closing lid portion 4b can be integrated.

Here, the opening/closing lid portion 3b does not always need to be attached via the pivot pin 22 to the bracket main body portion 2b. As long as the opening/closing lid portion 3b is attached to the bracket main body portion 2b so as to be freely opened and closed, a method for attaching it can be selected from known means as necessary.

The opening/closing lid portion 3b does not need to be formed in the shape of a substantially hemispherical surface, and any shape may be adopted as long as the opening/closing lid portion 3b is formed in the shape of a smooth curve.

The bracket main body portion 2b and the opening/closing lid portion 3b do not need to be integrated by fitting of the protrusion portions 35 provided on the opening/closing lid portion 3b to the fitting concave portions 26 formed in the bracket main body portion 2. For example, they may be integrated with the elastic string-shaped member 51 described previously.

The tooth abutting plate portion 4b includes, on one surface side, a smooth first surface portion 41 that abuts on the surface of the first premolar T4 and the second premolar T5 on the side of the tongue and includes, in a region of a substantially center of the other surface side, a second surface portion 42 that includes an adhering surface portion 43 to which the bracket main body portion 2b is adhered. The tooth abutting plate portion 4b is processed to be curved along the shape of the surface of the first premolar T4 and the second premolar T5 on the side of the tongue.

Figure 9A:
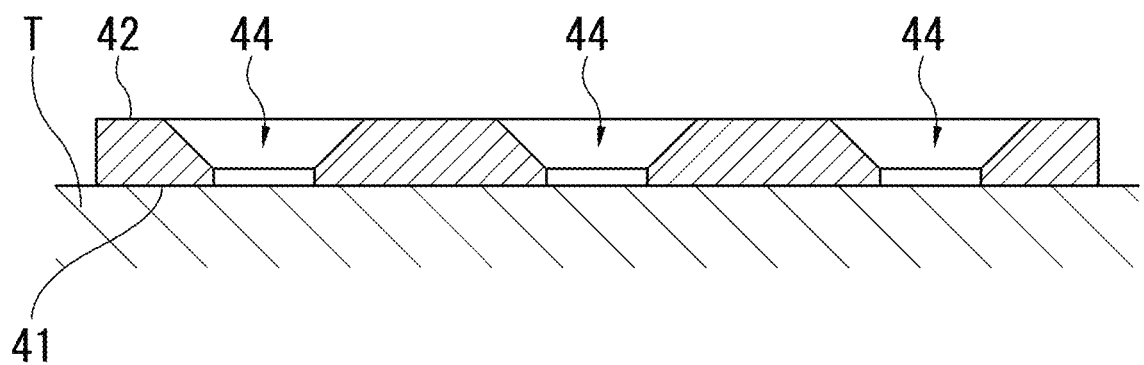
FIGS. 9A and 9B are enlarged cross-sectional views showing charging holes in the dental brace according to the second embodiment of the present invention.

In each of the positions symmetrical with respect to the adhering surface portion 43 of the tooth abutting plate portion 4b in the direction of alignment of the teeth, three charge hole portions 44 (a total of six charge hole portions 44) are formed. As shown in FIG. 9A, the charge hole portion 44 is formed in a substantially tapered shape which extends from the side of the second surface portion 42 of the tooth abutting plate portion 4b to the side of the first surface portion 41.

Here, it is not always necessary to form the total of six charge hole portions 44. Five or less charge hole portions 44 or seven or less charge hole portions 44 may be formed, and the number of charge hole portions 44 can be changed as necessary according to the installation area of the tooth abutting plate portion 4b on the teeth T, etc.

It is not always necessary to form the charge hole portions 44 in the positions symmetrical with respect to the adhering surface portion 43 in the direction of alignment of the teeth. The charge hole portions 44 may be formed in any region as long as the region is the peripheral edge of the adhering surface portion 43. However, the charge hole portions 44 are formed in the positions symmetrical with respect to the adhering surface portion 43 in the direction of alignment of the teeth, and thus an effect as an anti-removal member caused by an adhesive R can be made to uniformly act on the entire dental brace 1b, with the result that adhesion strength can be further enhanced.

The first surface portion 41 of the tooth abutting plate portion 4b does not need to be smooth. For example, as in the first surface portion 41 of the dental brace 1a according to the first embodiment, the convex thread portions 45 may be provided.

The charge hole portion 44 does not always need to be formed in a substantially tapered shape which extends from the side of the second surface portion 42 to the side of the first surface portion 41. For example, a configuration may be adopted in which, as described in the first embodiment, a step portion is formed in the inner wall surface of the charge hole portion 44 such that a diameter on the side of the first surface portion 41 of the charge hole portion 44 is made wider than a diameter on the side of the second surface portion 42.

Figure 9B:
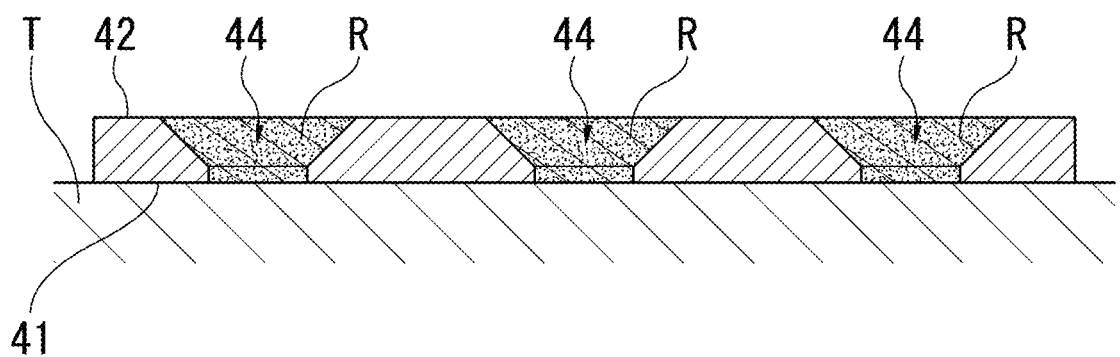

When the dental braces 1b including the tooth abutting plate portions 4b where the charge hole portions 44 as described above are formed are fitted to the first premolar T4 and the second premolar T5, the adhesive R is first applied to the first surface portion 41 of the tooth abutting plate portion 4b. Here, part of the adhesive R applied to the first surface portion 41 enters the charge hole portions 44 as shown in FIG. 9B and is thereafter cured.

Here, the charge hole portion 44 is formed in a tapered shape which extends from the second surface portion 42 to the first surface portion 41, and thus the cured adhesive R functions as a member for preventing the tooth abutting plate portion 4b from being removed in the direction of the side of the tongue. Hence, even when the dental braces 1b are removed from a set-up impression model M and are attached to the interior of the oral cavity of the person to be treated, sufficient adhesion strength can be maintained for a long time.

Embodiment 3

A dental brace 1c according to a third embodiment of the present invention will then be described with reference to FIGS. 10A, 10B and 10C. Although, in the third embodiment, for convenience of description, a case where the dental braces 1c are attached to the premolars (the first premolar T4 and the second premolar T5) will be described, the dental braces 1c can be attached to the other teeth T (for example, the central incisor T1, the lateral incisor T2 and the canine tooth T3). The same portions as in the other embodiments are identified with the same signs, and repeated description will be omitted.

Figure 10A:
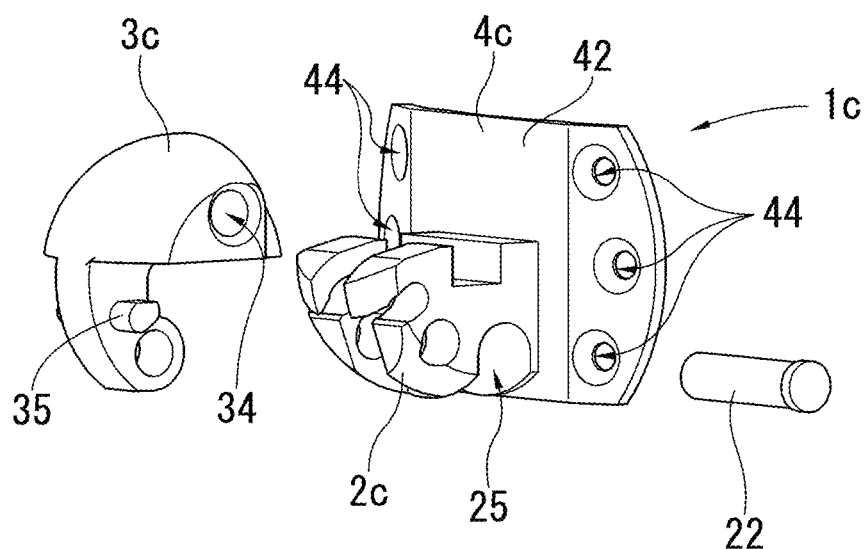
FIGS. 10A, 10B and 10C are perspective views of a dental brace according to a third embodiment of the present invention.

The dental brace 1c according to the third embodiment differs from the second embodiment in the shape of an opening/closing lid portion 3c as shown in FIG. 10A. Specifically, in the opening/closing lid portion 3c of the dental brace 1c according to the third embodiment, a through hole portion 34 is formed in the opening/closing lid portion 3c. The through hole portion 34 has the same function as the through hole portion 34 of the dental brace 1a according to the first embodiment.

Figure 10B:
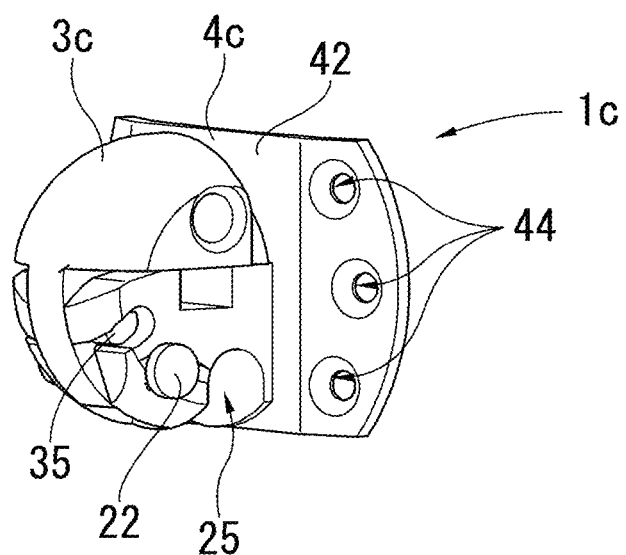

First, at an early stage of treatment, as shown in FIG. 10B, protrusion portions 35 provided on the lid side pivot hole portion 31 of the opening/closing lid portion 3c are fitted to fitting concave portions 26 formed in a bracket main body portion 2c, and thus the bracket main body portion 2c and the opening/closing lid portion 3c are integrated.

Here, since at an early stage of treatment, the archwire W whose diameter is small is used, a rotation torque which acts from the archwire W on the dental braces 1c is relatively small. Thus, it is possible to maintain a state where the protrusion portions 35 and the fitting concave portions 26 are fitted to each other.

Figure 10C:
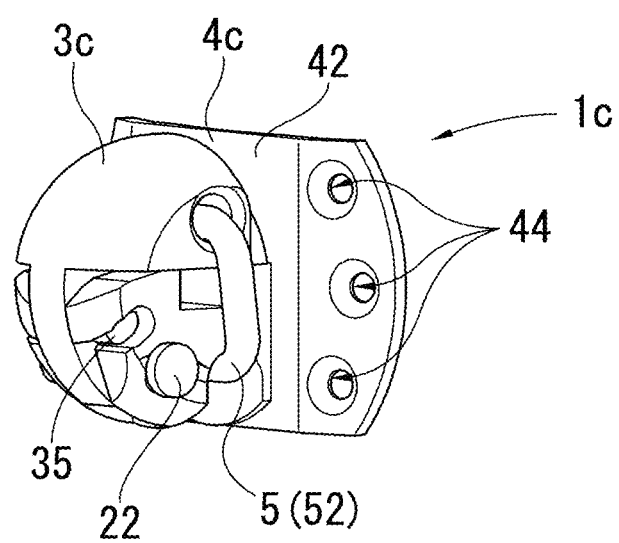

On the other hand, the treatment progresses, and at a later stage of treatment, as shown in FIG. 10C, a stainless steel string-shaped member 52 is engaged with a first engagement groove portion 25 formed in the bracket main body portion 2c and the through hole portion 34 formed in the opening/closing lid portion 3c so as to be securely tightened, and thus the bracket main body portion 2c and the opening/closing lid portion 3c are integrated.

Here, at a later stage of treatment, as the archwire W which is used, the archwire W whose diameter is larger than the diameter at an early stage of treatment is used, and thus a rotation torque which is larger than that at an early stage of treatment acts from the archwire W on the dental braces 1c. Hence, the integration of the bracket main body portion 2c and the opening/closing lid portion 3c cannot be kept only by fitting of the protrusion portions 35 and the fitting concave portions 26. In this regard, the stainless steel string-shaped member 52 is engaged with the first engagement groove portion 25 and the through hole portion 34 so as to be securely tightened, and thus even when a large torque acts from the archwire W on the dental brace 1c, the integration of the bracket main body portion 2c and the opening/closing lid portion 3c can be kept.

Here, it is not always necessary to use the stainless steel string-shaped member 52 as the string-shaped member 5, and for example, the elastic string-shaped member 51 may be used. However, in order to withstand a certain rotation torque acting from the archwire W, it is preferable to use the stainless steel string-shaped member 52 which can secure a certain degree of rigidity.

REFERENCE EMBODIMENT

Figure 11A:
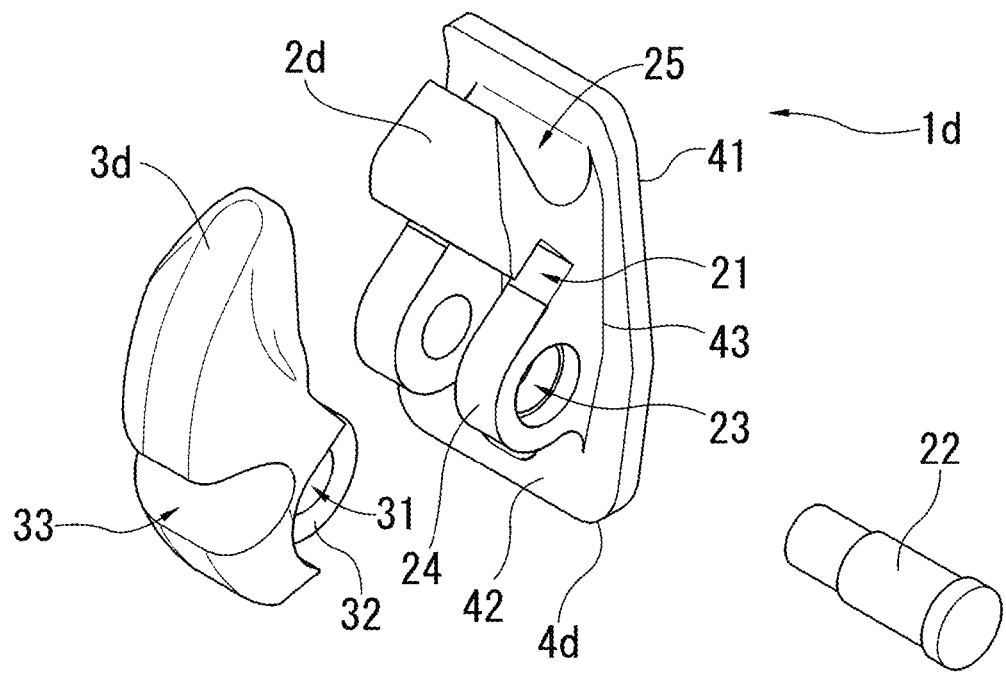
FIGS. 11A and 11B are perspective views of a dental brace in a reference embodiment of the present invention.
Figure 11B:
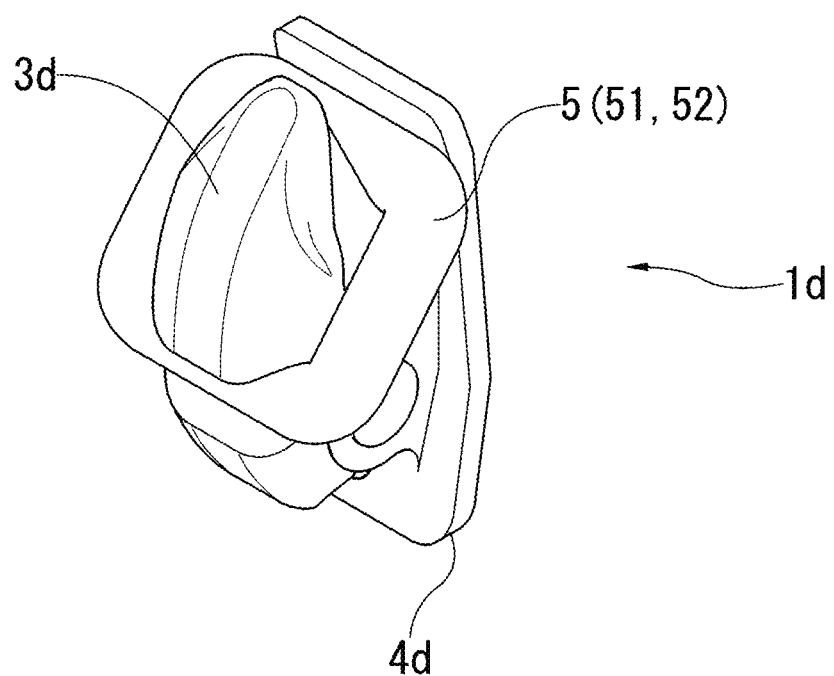

A dental brace 1d according to a reference embodiment of the present invention will then be described with reference to FIGS. 11A and 11B. Although, in the reference embodiment, as in the first embodiment, a case where the dental braces 1d are attached to the central incisor T1, the lateral incisor T2 and the canine tooth T3 will be described, the dental braces 1d can be attached to the other teeth T (for example, the first premolar T4 and the second premolar T5). The same portions as in the other embodiments are identified with the same signs, and repeated description will be omitted.

The dental braces 1d according to the reference embodiment are shaped along the surface of the central incisor T1, the lateral incisor T2 and the canine tooth T3 on the side of the tongue, and the dental brace 1d has a vertically long shape as a whole and is mainly formed with a bracket main body portion 2d, an opening/closing lid portion 3d and a tooth abutting plate portion 4d.

As in the first embodiment, in the dental braces 1d which are installed on the central incisor T1 and the lateral incisor T2, an archwire insertion groove portion 21 is formed in the shape of an arc with a predetermined radius of curvature (R15 to R20) along the direction of alignment of the teeth, and thus the dental brace 1d can slide with respect to the archwire W.

On the other hand, the dental brace 1d which is installed on the canine tooth T3 is formed in the shape of an arc with the predetermined radius of curvature (R15 to R20) or is formed linearly according to the state of the alignment of the teeth in the person to be treated.

In the opening/closing lid portion 3d, the outer surface thereof is formed in the shape of a gentle curved surface, and a second engagement groove portion 33 with which a string-shaped member 5 to be described later is engaged and whose cross section is substantially concave is formed.

The tooth abutting plate portion 4d includes, on one surface side, a smooth first surface portion 41 that abuts on the surface of the central incisor T1, the lateral incisor T2 and the canine tooth T3 on the side of the tongue and includes, in a region of a substantially center of the other surface side (the side of the bracket main body portion 2d) on a side opposite to the first surface portion 41, a second surface portion 42 that includes an adhering surface portion 43 to which the bracket main body portion 3b is adhered.

The string-shaped member 5 is a string-shaped member which regulates the movement of the opening/closing lid portion 3d to an opened position in a state where the opening/closing lid portion 3d is brought into a closed position for the archwire insertion groove portion 21 without interference with the archwire W, and can be formed with an elastic string-shaped member 51 or a stainless steel member 52. As shown in FIG. 11B, the string-shaped member 5 is engaged with the first engagement groove portion 25 and the second engagement groove portion 33 so as to be securely tightened, and thus the bracket main body portion 2d and the opening/closing lid portion 3d are integrated.

As described above, in the dental brace and the method for attaching the dental brace according to the present invention, by simple processing, the dental braces are securely attached to the teeth, and thus sufficient adhesion strength can be maintained within the oral cavity of the person to be treated for a long time.

REFERENCE SIGNS LIST 1, 1a, 1b, 1c, 1d Dental brace
2a, 2b, 2c, 2d Bracket main body portion
21 Archwire insertion groove portion
22 Pivot pin
23 Main body side pivot hole portion
24 Main body side pivot portion
25 First engagement groove portion
26 Fitting concave portion
3a, 3b, 3c, 3d Opening/closing lid portion
31 Lid side pivot hole portion
32 Lid side pivot portion
33 Second engagement groove portion
34 Through hole portion
35 Protrusion portion
4a, 4b, 4c, 4d Tooth abutting plate portion
41 First surface portion
42 Second surface portion
43 Adhering surface portion
44 Charge hole portion
45 Convex thread portion
46 Step portion
47 V-shaped groove portion
5 String-shaped member
51 Elastic string-shaped member
52 Stainless steel string-shaped member
T Teeth
T1 Central incisor
T2 Lateral incisor
T3 Canine tooth
T4 First premolar
T5 Second premolar
M Set-up impression model
R Adhesive
W Archwire

The invention claimed is:

1. A dental brace comprising:
  a bracket main body portion that includes an archwire insertion groove portion through which an archwire can be inserted;
  an opening/closing lid portion coupled via a pivot to the bracket main body portion so as to be freely opened and closed with respect to the archwire insertion groove portion; and
  a tooth abutting plate portion which includes:
    on one surface side, a first surface portion that is configured to contact a lingual surface of a tooth;
    on a side opposite the first surface portion, a second surface portion that includes an adhering surface portion to which the bracket main body portion is adhered;

an inner wall surface forming a charge hole portion between the first surface portion and the second surface portion wherein the charge hole portion has a first diameter on the side of the second surface portion wider than a second diameter on the side of the first surface portion;

a plurality of protruding strips around the charge hole portion on the side of the first surface portion; and on the side of the second surface portion, a V-shaped groove portion with a V-shaped cross section, wherein the archwire insertion groove portion includes a cross section that is concave, wherein the V-shaped groove portion passes through the charge hole portion such that a contact area of an adhesive with the dental brace is increased.

2. The dental brace according to claim 1, wherein the charge hole portion includes a step portion on a predetermined position of the inner wall surface.

3. The dental brace according to claim 1, wherein the tooth abutting plate portion includes a plurality of the inner wall surfaces forming a plurality of the charge hole portions, the charge hole portions formed in a peripheral edge of the adhering surface portion.

4. The dental brace according to claim 1, comprising:
a string-shaped member with which the bracket main body portion and the opening/closing lid portion are securely tightened without perturbing the archwire already inserted through the archwire insertion groove portion.

5. The dental brace according to claim 4, wherein the string-shaped member is engaged with a first engagement groove portion formed in the bracket main body portion, and with a second engagement groove portion formed in the opening/closing lid portion, wherein the first engagement groove portion includes a cross section that is concave, wherein the second engagement groove portion includes a cross section that is concave.

6. The dental brace according to claim 4, wherein the string-shaped member is engaged with:
a first engagement groove of the bracket main body portion, the first engagement groove having a concave cross section, and
a through-hole portion which is formed in and passes through the opening/closing lid portion.

7. The dental brace according to claim 1, wherein the archwire insertion groove portion has a horizontally curved shape with a predetermined radius of curvature that follows the lingual surface of the tooth in a direction of alignment of teeth.

8. The dental brace according to claim 7, wherein the radius of curvature of the archwire insertion groove portion is within a range of R15 to R20.

9. The dental brace according to claim 7, wherein the radius of curvature of the archwire insertion groove portion in the bracket main body portion is R20 if installed on an upper jaw, or R15 if installed on a lower jaw.

10. The dental brace according to claim 1, wherein the archwire insertion groove portion is horizontally straight and follows the lingual surface of the tooth in a direction of alignment of teeth.

* * * * *